UNITED STATES PATENT OFFICE.

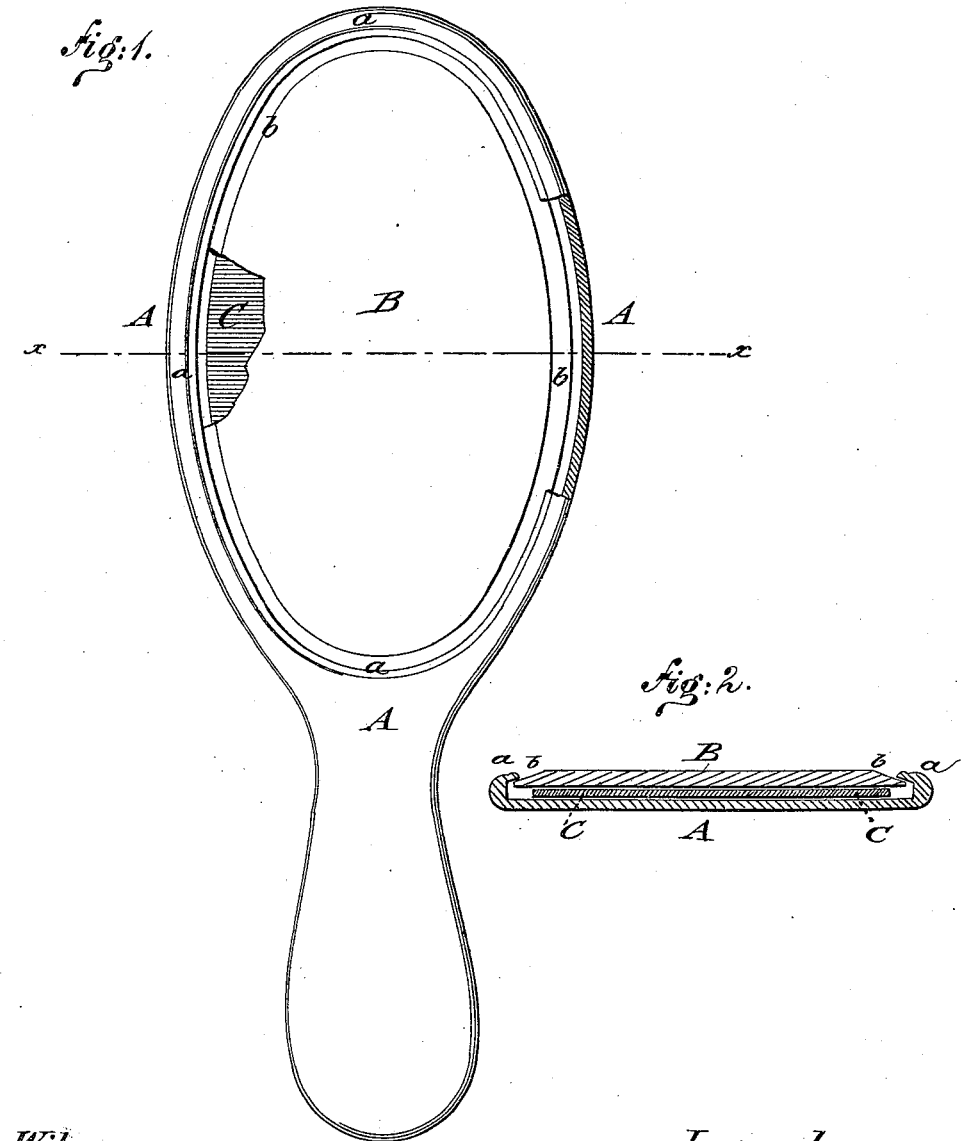

KARL L. ZEÜN, OF NEW YORK, N. Y.

HAND-MIRROR.

SPECIFICATION forming part of Letters Patent No. 246,270, dated August 23, 1881.

Application filed June 24, 1879.

*To all whom it may concern:*

Be it known that I, KARL LUDWIG ZEÜN, of the city, county, and State of New York, have invented certain new and useful Improvements in Manufacturing Hand-Mirrors, of which the following is a specification.

In the accompanying drawings, Figure 1 represents a top view, and Fig. 2 a vertical transverse section on line $x\ x$, Fig. 1, of a hand-mirror manufactured according to my improved method.

Similar letters of reference indicate corresponding parts.

One of the main objections to the hand-mirrors in general use, especially to those that are of ivory or other expensive and elaborately-finished material, consists in the shrinking of the ivory, hard rubber, celluloid, or other frame, and in the splitting or cracking of the rim that encircles the glass. This spoils the mirrors irreparably, and forms quite a drawback to their use. Another defect of these mirrors is the unreliable method of fastening the glass into the frame, which is accomplished by a narrow strip or band of metal, ivory, or other material that is cemented to the edge of the encircling-rim and to the glass, and liable to get loose, so that the glass is dropped from the frame and broken.

My invention is intended to furnish an improved hand-mirror and method of inserting and retaining the glass, by which the aforementioned defects are remedied and the glass secured reliably to the frame in such a manner that the injuring of the frame by shrinkage, as well as the detaching and dropping of the glass, are entirely avoided.

The invention consists of a round, oval, or other frame, having a beveled projecting rim, and of a beveled mirror-glass of corresponding shape, that is inserted first at one side of the frame, then pushed in a direction diagonal to the longitudinal and transverse axes, and finally dropped at the opposite side into the frame and then retained in the frame by the spring-action of a backing or cushion of elastic fabric interposed between the glass and the body of the frame.

Referring to the drawings, A represents the frame of a hand-mirror, which frame is made either of ivory, hard rubber, celluloid, wood, or other suitable material. It is provided with a projecting rim, $a$, having an inward bevel at the under side, as shown in Fig. 2.

The mirror B is provided with the usual beveled edge, $b$. The glass B is inserted into the frame by introducing the beveled edge at one side of its longitudinal axis, below the beveled retaining-rim of the frame, and pushing it in a direction diagonal to the central axes as far as the space below the same will allow. When one side is thus pushed in, the other side has sufficient play to drop in, clear of the upper edge of the rim, so that by moving the glass slightly back in an opposite direction it is entirely surrounded by the retaining-rim.

Between the mirror-glass and the body of the frame is interposed a backing or cushion, C, of soft felt or other springy or elastic material, that gives sufficiently when the glass is inserted, but expands as soon as the pressure thereon is relaxed. The spring-action of the backing C keeps the mirror tightly pressed against the beveled rim of the frame and prevents thus any possibility of its getting detached therefrom. The elastic nature of the backing also protects the glass against breaking when the mirror is dropped.

As the surface of the under side of the mirror is necessarily somewhat smaller than the surface of the frame within the lowermost edge of the rim, it admits the shrinking of the frame without the least injury, as no pressure is exerted by the mirror thereon.

Mirrors of this construction may also be easily repaired, as the glass may be removed from the frame in the same manner, but in reversed order. This method of fastening furnishes a neat and very durable and reliable construction for hand-mirrors of all kinds.

Having thus described my invention, I claim as new and desire to secure by Letters Patent—

The combination of a mirror-frame, having an inwardly-beveled retaining-rim, made in one piece with the back, with a beveled mirror-glass, the back surface of which is smaller than the surface of the frame inclosed by the groove under the rim, and with an elastic packing or cushion that is interposed between the glass and the back of the frame, substantially as and for the purpose set forth.

In testimony that I claim the foregoing as my invention I have signed my name, in presence of two witnesses, this 16th day of June, 1879.

KARL L. ZEÜN.

Witnesses:
A. JOS. KAPP,
PAUL GOEPEL.